United States Patent [19]

Fowler

[11] Patent Number: 4,465,956
[45] Date of Patent: Aug. 14, 1984

[54] CONTROL CIRCUIT FOR SWITCHING DUAL FUNCTION ELECTRICAL APPLIANCES

[76] Inventor: Ricky C. Fowler, 2426 Village Green, Garland, Tex. 75042

[21] Appl. No.: 469,957

[22] Filed: Feb. 25, 1983

[51] Int. Cl.$^3$ .............................................. H02P 7/00
[52] U.S. Cl. .................................. 318/268; 318/336; 318/603; 318/490; 307/115
[58] Field of Search ............... 318/603, 430, 445, 453, 318/454, 490, 391, 51, 257, 336, 268; 307/362, 112, 113, 115

[56] References Cited

U.S. PATENT DOCUMENTS

| | | | |
|---|---|---|---|
| 3,206,665 | 9/1965 | Burlingham | 318/603 X |
| 3,887,856 | 6/1975 | Cicchiello | 318/416 X |
| 3,943,421 | 3/1976 | Shibata et al. | |
| 4,320,329 | 3/1982 | Gille et al. | 318/445 X |
| 4,328,540 | 5/1982 | Matsuoka et al. | |
| 4,413,211 | 11/1983 | Fowler | |

OTHER PUBLICATIONS

Tecmaster, Ceiling Fan & Light Controls, 1981, p. 3–TM301–Fantouch.
Radio Shack Advertising Brochure, 1982, p. 17–Plug'n Power.

*Primary Examiner*—B. Dobeck
*Assistant Examiner*—Bentsu Ro
*Attorney, Agent, or Firm*—Thomas L. Cantrell; Mark A. Smith

[57] ABSTRACT

Disclosed is a control circuit for dual function electrical appliances such as multi-speed ceiling fans having light fixtures. The circuit uses the hot line of a cable to carry power to the appliance and to carry two distant signals for remote control thereof. A two button switch intercepts the hot line at a convenient position and provides means for selectively half-wave rectifying AC current therein. Two independent signals, positive and negative pulses, are produced at the two button switch and transmitted to the appliance through the hot line of the cable. These signals are received in control circuitry within the appliance housing which senses the pulses, identifies whether each pulse is positive or negative and counts the number of pulses in both the positive and negative phase caused by toggling the two button switch. Signals are processed in the control circuitry to switch different functions within the dual function appliance and the number of pulses are counted to provide switches to different operational states within either of the two functions. In the ceiling fan embodiment illustrated, pulses in the positive phase control light and pulses in the negative phase control the motor and differing counts of negative pulses trip various combinations of relays to provide a plurality of motor speeds.

12 Claims, 3 Drawing Figures

CONTROL CIRCUIT FOR SWITCHING DUAL FUNCTION ELECTRICAL APPLIANCES

BACKGROUND

The majority of consumer electrical appliances in use in the United States as well as in many other regions of the world are designed to be powered between one hot line carrying AC current and the neutral line. Many of these appliances have a plurality of functions, some combination of which is selected for each use of the appliance. However, it is not always convenient to manually select the desired functions at the appliance.

Ceiling fans which incorporate light fixtures are an excellent illustration of a multi-function electrical appliance for which manual control at the appliance proves unsatisfactory. In this instance, the electrical appliance is suspended from the ceiling and direct access to controls on the housing requires ladders or the like. Alternatively, it has been common practice to provide strings or chains depending to an accessible height from the fan housing. Nevertheless, the string often proves obtrusive to the room and is otherwise unsatisfactory.

Ceiling fans and other common electrical appliances for which the present invention would be most applicable are permanently wired into existing cable that is in place behind the walls and ceiling. It is desired to provide such appliances with remote controls which can utilize the existing cable in place between the AC power source and the appliance. Further, it is desired to provide independent remote control for two independent functions, here the light and the fan motor, by means of independent signals. The present invention is far superior to prior remote control circuits that lack this latter provision. Prior remote control circuits advanced by the Applicant which lack this independence of function are disclosed in copending applications Ser. No. 318,393, filed Nov. 5, 1981, entitled Remote Load Selector Circuit and Method; and Ser. No. 333,637, filed Dec. 23, 1981, entitled Control Circuit for Electrical Appliances.

SUMMARY OF THE INVENTION

The present invention provides improved remote control for dual function electrical appliances and is particularly suitable for use in controlling multi-speed electrical ceiling fans having light fixtures mounted therein. As described above, the ceiling fan is powered on pre-existing cable having a hot line and a neutral line in place within the ceiling and walls. The ceiling fan and the light are powered between the hot line and the neutral line. However, the present invention also uses the hot line of the two conductor cable to carry two distinct and independent signals which control the motor speed and the light of the fan, respectively.

Means for selectively half-wave rectifying AC current in the hot line intercepts that line at a convenient and accessible position along the cable. In the preferred embodiment, a two button switch intercepts the hot line which is therein split into first and second leads before rejoining to continue the hot line. Each lead of the two button switch has one switch positioned to selectively open that lead.

The first lead is provided with means actuated by a first button of the two button switch for rectifying the AC current to permit conduction of positive phase voltage only. Conversely, the second lead is provided with means to rectify the AC current to conduct only negative phase voltage.

Each of the switches in the two button switch are normally held in the closed position which passes full wave AC current. Opening the first lead by operation of the first button allows passage of only negative phase voltage from the AC source through the two button switch and to sensing circuits controlling the fan and light. Alternatively, operating the second button to open the second lead provides the passage of only positive phase voltage to the control circuitry for the fan and light.

Thus, there are two independent signals, positive and negative pulses, produced at the two button switch and transmitted to the fan and light through the hot line of the cable. These signals are received in control circuitry within the fan and light housing which senses the pulses, identifies whether each pulse is positive or negative and counts the number of pulses in both the positive and negative phase caused by toggling the switches.

Further, the independent signals are processed in the control cicuitry to switch different functions within the dual function appliance and the number of pulses are counted to provide switching to different operational states within either of the two functions. In the preferred embodiment, pulses in the positive phase control the light and pulses in the negative phase control the motor and differing counts of negative pulses trip various combination of relays to provide a plurality of motor speeds.

A BRIEF DESCRIPTION OF THE DRAWINGS

A DETAILED DESCRIPTION OF THE PREFERRED EMBODIMENT

The Circuit

Figure 1:
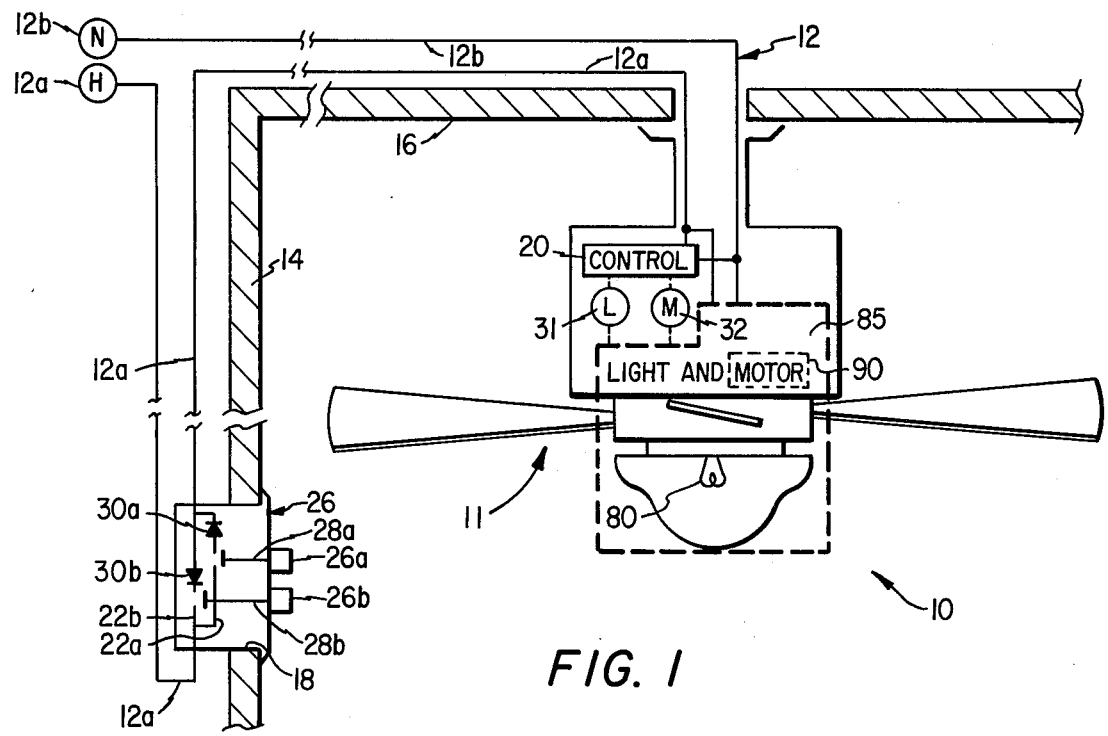
FIG. 1 is a schematic of a multi speed ceiling fan and light incorporate a control circuit constructed in accordance with the present invention for switching multiple function electrical appliances.

FIG. 1 schematically illustrates the control device of the present invention as applied to ceiling fan 11 where the present invention is designated as speed and light control 10. However, it is evident that the present invention has many control applications for electrical appliances and the like powered through cable 12, which is standard wiring for both residential and commercial applications.

Cable 12 presents hot line 12a and neutral line 12b and runs from an AC source to ceiling fan 11 behind ceiling 16. However, hot line 12a is intercepted and brought down to switch box 18 which is set in wall at an accessible position.

After passing to ceiling fan 11 through two button switch 26, hot line 12a is connected to power the light and fan motor, collectively designated 85 in FIG. 1, and as the signal input to control circuitry 20 of speed and light control 10.

Returning to two button switch 26, hot line 12a is split into two parallel leads, leads 22a and 22b, within switch box 18. Leads 22a and 22b rejoin into hot line 12a after cable 12 passes switch box 18 but, where separated, the parallel leads allow an initial processing of AC current into signals carried by hot line 12a to control circuitry 20.

Two button switch 26 has breaker switches 28a, and 28b which are actuated by buttons 26a and 26b, respectively. Breaker switch 28a is interposed in lead 22a of hot line 12a and is connected on one side to the AC source, and to the anode of diode 30a on the other side. Breaker switch 28b is interposed in lead 22b of hot line 12a and is connected on one side to the AC source and to the cathode of diode 30b on the other side. Leads 22a and 22b rejoin to continue as unitary line 12a at the cathode of diode 30a and the anode of diode 30b.

Control circuitry 20 is powered between hot line 12a and neutral line 12b. The control circuitry processes the signals established by the positions of buttons 26a and 26b to throw a battery of relays here designated generally as relays 31 and 32. These relays control the light and the fan motor circuitry 85 which is powered between hot line 12a and neutral line 12b.

Figure 2:
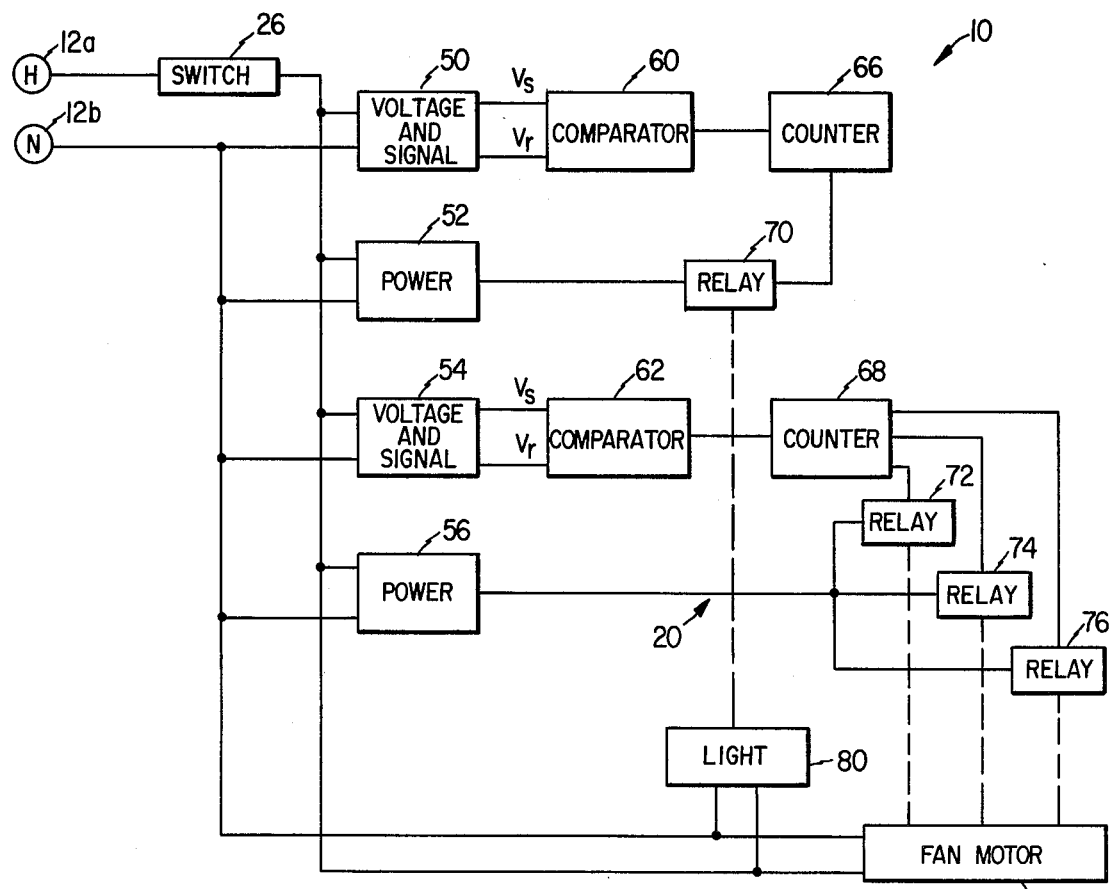
FIG. 2 is a schematic diagram of the circuitry for a dual control circuit constructed in accordance with the present invention for switching multiple function electrical appliances.

FIG. 2 illustrates a schematic of the circuitry of speed and light control 10. Again, the lines of cable 12 are designated 12a and 12b. Hot line 12a is connected to switch 26, the output of which is connected to voltage supply and signal processor 50, power supply 52, power and signal processor 54 and power supply 56. Hot line 12a is also connected to light 80 and fan motor 90.

Neutral 12b is connected to light 80 and motor 90 of fan 11, not otherwise shown in FIG. 2; to voltage and signal processor 50; to power supply 52; to voltage and signal processor 54; and to power supply 56.

The output lines of voltage and signal processor 50 are designated in FIG. 2 for reference voltage $V_R$ and signal voltage $V_S$ and are connected as input to comparator 60. The output signal of comparator 60 is connected as the input to counter circuitry 66, the output of which is connected as a signal input to relay 70. Relay 70 is linked to actuate light 80. The power input to relay 70 is connected to receive power from the power supply 52.

The outputs of voltage and signal processor 54 are designated as reference voltage $V_R$ and signal voltage $V_S$ and are both connected as input signals to comparator 62. The output of comparator 62 is connected to counter circuitry 68 which has multiple outputs connected to relays 72, 74 and 76, respectively. Relays 72, 74 and 76 are each connected to power supply 56 and linked to control the operative state of fan motor 90.

Figure 3:
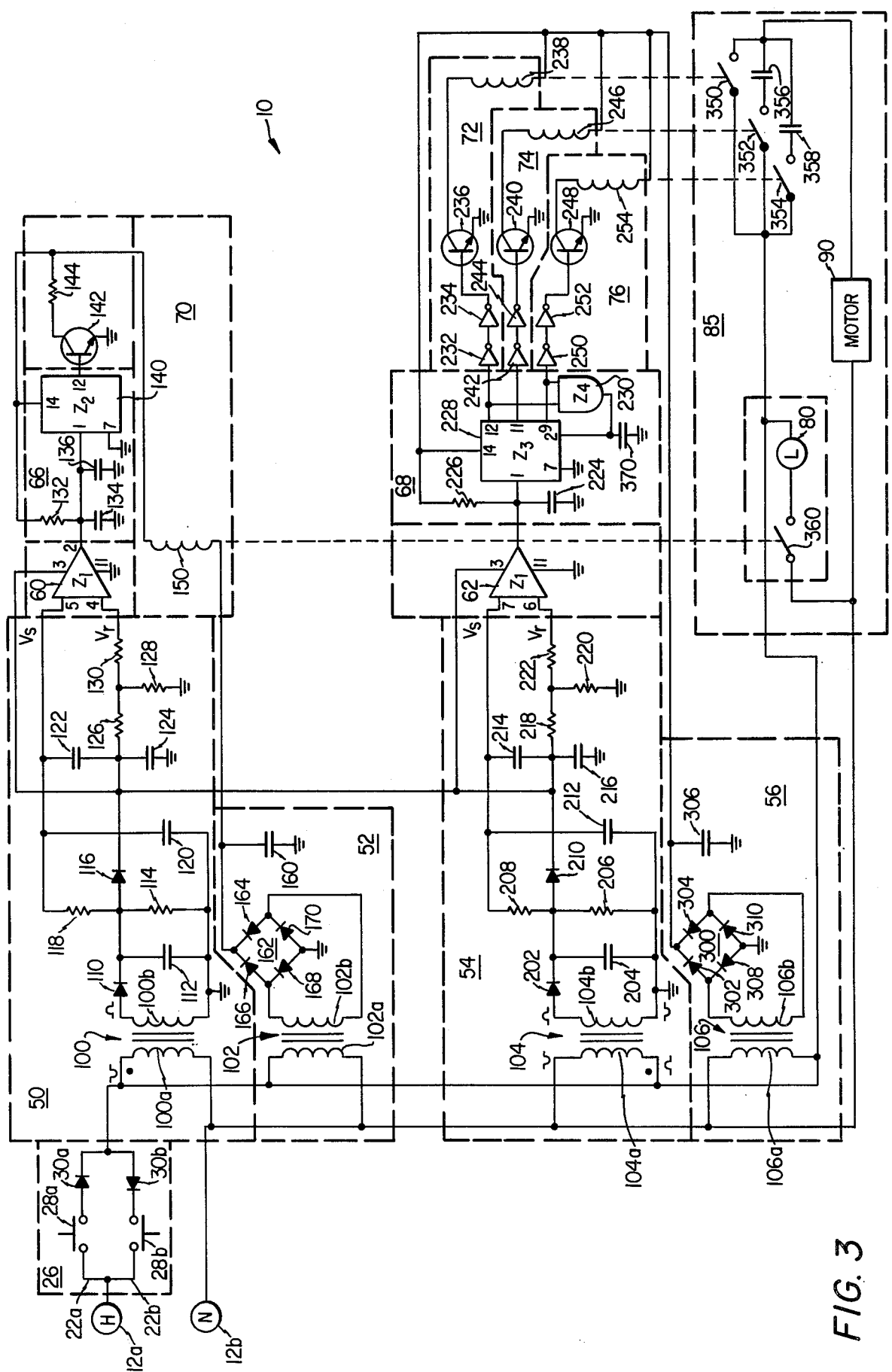
FIG. 3 is a circuit diagram for a dual control circuit constructed in accordance with the present invention for switching multiple function electrical appliances.

FIG. 3 is a circuit diagram of a control for electrical appliances constructed in accordance with the present invention, illustrated herein as speed and light control circuitry 10 for a ceiling fan.

The illustrated control circuitry, fan light 80 and fan motor 90 are each wired from standard cable 12 having hot line 12a and neutral line 12b. Hot line 12a connects two button switch 26 to the AC power source.

Hot line 12a is split into two parallel lines 22a and 22b within switch 26. Line 22a connects the first side of switch 28a to the AC power source and the second side of 28a is connected to the anode of diode 30a. Line 22b connects the control circuitry 20 to the AC power source through hot line 12a in a manner similar to the connection through line 22a. However, line 22b connects a first side of switch 28b to the AC power source and connects the second side of switch 28b to the cathode of diode 30b.

The cathode of diode 30a and the anode of cathode 30b are each connected to the hot side of the primary coil for each of step down transformers 100, 102, 104, and 106 of the voltage and signal supply 50, power supply 52, voltage and signal supply 54 and power supply 56, respectively.

Transformer 100 is an inverting transformer having primary coil 100a and secondary coil 100b. The primary coil is connected on one side to hot line 12a which emerges from switch 26 and is connected to neutral line 12b on the other side. The hot side of secondary coil 100b in transformer 100 is connected to the anode of diode 110. The other side of secondary coil 100b goes to ground. The cathode of diode 110 is connected to ground through capacitor 112, to ground through resistor 114, to the anode of diode of 116 and to the first side of resistor 118.

The other side of resistor 118 is connected as a first input to comparator 60 at pin 5 of component $Z_1$ of the preferred embodiment, to ground through capacitor 120, and is connected to the first side of capacitor 122.

The other side of capacitor 122 is connected to the cathode of diode 116, the first side of resistor 126 and to ground through capacitor 124. The second side of resistor 126 is connected through resistor 130 to comparator 60 as a second input thereto at pin 4 of component $Z_1$ of the preferred embodiment and goes to ground through resistor 128.

The output of comparator 60 at pin 2 of component $Z_1$ is connected to ground through capacitor 134 and 136, to counter circuitry 66 as an input to counter 140 at pin 1 in component $Z_2$ of the preferred embodiment, and to the first side of resistor of 132. The output of counter 140, pin 12 of component $Z_2$, is connected to the base of NPN transistor 142. The emitter of transistor 142 goes to ground and the collector is connected through resistor 144 to power supply input of counter 140, at pin 14 of component $Z_2$, to the second side of the resistor 132, and to one side of relay coil 150 of relay 70.

The other side of relay coil 150 is connected to ground through capacitor 160 and to the cathodes of diode 164 and 166 of full wave rectifying bridge 162 of power supply 52. One side of secondary coil 102b of transformer 102 is connected to the cathode of diode 170 and to the anode of diode 164 of full wave rectifying bridge 162. The other side of secondary coil 102b is connected to the cathode of diode 168 and the anode of diode 166. The anodes of diodes 168 and 170 go to ground.

The primary coil 102a of transformer 102 in power supply 52 is connected to hot line 12a and neutral line 12b.

Similarly, voltage and signal processor 54 is powered across hot line 12a and neutral line 12b through primary coil 104a of inverting transformer 104. The hot side of secondary coil 104b is connected to the anode of diode 202. The other side of secondary coil 104b goes to ground. The cathode of diode 202 goes to ground through capacitor 204 and resistor 206 and is connected to one side of resistor 208 and to the anode of diode 210. The other side of resistor 208 is connected to ground through capacitor 212 and is connected to one side of capacitor 214 and to comparator 62 as an input at pin 7 of component $Z_1$ of the preferred embodiment.

Returning to voltage and signal processor 54, the cathode of diode 210 is connected to ground through capacitor 216, to the second side of capacitor 214, and to a first side of resistor 218. The second side of resistor 218 is connected to ground through resistor 220 and is connected to comparator 62 as an input through resistor 222 at pin 6 of component $Z_1$.

In the preferred embodiment, the cathode of diode 210 is also connected to the power supply input of comparator 60 and 62 at pin 3 of component $Z_1$, and pin 11 thereof goes to ground.

The output of comparator 62 goes to ground through capacitor 224, to a first side of resistor 226 and to counter 228 within counting circuitry 68 at pin 1 of component $Z_3$ in the preferred embodiment. Three outputs of counter 228 are utilized and in preferred embodiment these outputs are accessed at pins 12, 11, and 9 of component $Z_3$. Pins 12, 11 and 9 are connected to relays 72, 74 and 76, respectively. These connections are detailed below.

Pin 12 of component $Z_3$ is connected to AND gate 230 which is designated as $Z_4$ and is connected as input to inverter 232. The output of inverter 232 is connected to the input of invertor 234 for which the output is connected to the base of NPN transistor 236. The emitter of transistor 236 goes to ground and the collector is connected to one side of relay coil 238. The other side of relay coil 238 is connected to ground through capacitor 306 and to the cathodes of diodes 302 and 304 of full wave rectifying bridge 300 in power supply 56. Relay coil 238 actuates switch 350 in light and motor circuitry 85 of the ceiling fan.

The output at pin 11 of counter 228 is connected to the base of NPN transistor 240 through the series of inverters 242 and 244. The emitter of transistor 240 goes to ground and the collector of transistor 240 is attached to one side of relay coil 246. The other side of relay coil 246 is connected to ground through capacitor 306 and to the cathode of diodes 302 and 304 in full wave rectifying bridge 300. Relay coil 246 actuates switch 352 in light and motor circuitry 85 of the ceiling fan.

The output at pin 9 of counter 228 is connected to the second input of AND gate 230 and to the base of NPN transistor 248 through the series of inverters 250 and 252. The emitter of transistor 248 goes to ground and the collector of transistor 248 is connected to one side of relay coil 254. The other side of relay coil 254 is connected to the cathodes of diodes 302 and 304 within full wave rectifying bridge 300 of power supply 56. Relay coil 254 actuates relay switch 354 in the circuitry of ceiling fan 11.

The output of AND gate 230 is connected to the reset pin of counter 228, here at pin of 2 of component $Z_3$, and to ground through capacitor 370.

The primary coil 106a of inverting transformer 106 in power supply 56 is connected across hot line 12a and neutral line 12b. Secondary coil 106b of transformer 106 is connected at one end to the cathode of diode 308 and the anode of diode 302 and is connected at the other end to the anode of diode 304 and the cathode of diode 310. The anodes of diode 308 and diode 310 go to ground.

The cathodes of diodes 302 and 304 are connected to ground through capacitor 306 and to relay coils 238, 246 and 254, all as discussed above. Further, the DC output at diodes 302 and 304 of rectifier 300 is connected to resistor 226 and, in the preferred embodiment, connected to counter 228 at pin 14 of component $Z_3$. Counter 228 is powered between the voltage supply at pin 14 and ground at pin 7.

Fan 11 is powered between hot line 12a and neutral line 12b. The hot line is connected to light 80 and to one side of switches 350, 352, and 354. The other side of these switches are connected to motor 90 through capacitors of varying capacity. Here the second side of switch 352 is connected to the motor through capacitor 356 and switch 354 is connected to the motor through capacitor 358. A third capacitance is provided through switch 350 which is connected to the motor with no additional capacitors. The other lead of motor 90 is connected to neutral line 12b.

Switch 360 is connected to the second terminal of light 80 on one side and to neutral line 12b.

Model numbers and manufacturers are tabulated below for various components that have been found to operate effectively within this particular embodiment. This list of components, in combination with appropriately selected additional components, is intended to merely illustrate one embodiment of the present invention and should in no way be read to limit the invention. Further, the illustrated peripheral connections are appropriate for these parts but modifications must be considered if different components are used even though the components are equivalent.

| COMPONENT/ELEMENTS | PART DESIGNATION | MANUFACTURER |
|---|---|---|
| $Z_1$/comparator 60 and comparator 62 | LM 339 | Texas Instruments |
| $Z_2$/counter 140 | CD 4024 | RCA |
| $Z_3$/counter 228 | CD 4024 | RCA |
| $Z_4$/AND gate 230 | CD 4081 | RCA |

The construction of the present invention is apparent from the foregoing drawings and description and attention now turns to further describing the operation of the present invention.

OPERATION

FIG. 1 illustrates fan 11 having multi-speed motor 90 and electrical light 80 and powered through cable 12 which runs behind ceiling 16 and wall 14. The power for operating the fan's light and motor is provided between hot line 12a and neutral line 12b. Switch box 18 is placed at a convenient location along cable 12 and intercepts the hot line. Two button switch 26 interrupts hot line 12a within switch box 18 and the hot line splits into two separate leads, each of which is half wave rectified through a diode.

Lead 22a has diode 30a positioned to allow only positive voltage to pass and diode 30b is positioned on lead 22b to provide only the passage of negative cycles of the AC current. In the normal position, switch 22a and 22b are both closed allowing full AC current to pass through the two button switch and proceed through the rejoined hot line 12a to fan and light control circuitry 20. However, when button 28a is toggled opening lead 22a, only negative cycles are allowed to pass through the two button switch. The converse is true with toggling button 28b from which only positive cylces are allowed to pass. These positive and negative cycles or pulses are sent to control circuitry 20 and the positive pulses are read and controlled at circuitry 20 to throw relay switch 31 and actuate the light through the light and motor circuitry 85. The negative voltage pulses are counted at control circuitry 20 and the output through relay battery 32 is dependent upon a number of negative pulses counted. Relay battery 32 determines the speed of the motor through light and motor circuitry 85. The interruption of the AC current that produces signals to control cirucitry 20 does not materially affect the usefulness of the current passing through switch 26 for powering light and motor circuitry 85.

FIG. 2 more fully discloses the operation of control circuitry 20 in relation to light 80 and motor 90. Full wave AC current is provided to voltage and signal processors 50 and 54 with switch 26 held in its normally closed position.

Power supply 52 provides the power to throw relay 70 to actuate light 80 when relay 70 receives the appropriate signal from counter 66. Similarly, power supply 56 provides the power to throw relays 72, 74 and 76 dependent upon receiving the correct signals at those relays from counter 58. Relays 72, 74 and 76 determine the operating speed of motor 90.

Voltage and signal processor 50 produces a reference voltage and a signal voltage to comparator 60 and it is the output of comparator 60 which controls counter 66. Comparator 60 is not responsive to alternating current. However, when the negative phase of the alternating current does not pass switch 26, a positive pulse is received at comparator 60 which sends a signal to counter 66 triggering the closing of relay 70.

Voltage and signal processor 54 similarly produces a reference voltage and a signal voltage which are forwarded to comparator 62. Again, comparator 62 is not responsive to full wave alternating current. However, when the positive phase of the alternating current is blocked and negative pulses proceed from switch 26 to voltage and signal processor 54, comparator 62 triggers an output to counter 68. Each discrete pulse of negative phase to voltage and signal processor 54 similarly is counted at counter 68 and the number of pulses translates to output signals from the counter which trigger different combination relays 72, 74 and 76. Reset provisions are discussed with respect to FIG. 3.

A fuller disclosure of the preferred embodiment is illustrated in FIG. 3. Two button switch 26 has switch 28a and 28b, each of which is normally held in the closed position.

The power circuitry for fan motor 90 and light 80 as well as signal sensitive control circuitry 20 are presented with current passing through switch 26. However, the signal generation at switch 26 discussed below does not materially affect available power at fan motor 90 nor light 80 aside from the intended switching function.

In this switch configuration, opening switch 28a presents only the positive phase of the AC voltage across primary coil 100a of inverting step down transformer 100. Thus a positive pulse produces a negative voltage secondary coil 100b which is isolated from the cirucit with diode 110. Thus the voltage $V_s$ passing resistor 118 drops while switch 28b is open and this input to the comparator is compared against the reference voltage discharging from capacitor 124. Diode 116 isolates the discharge of capacitor 124 from $V_s$. The reference voltage $V_r$ is processed across resistors 126, 128 and 130 prior to input at comparator 60.

Further in voltage signal processor 50, the output of secondary coil 100b is filtered by capacitor 112, resistor 114 and capacitor 120. Capacitor 122 controls oscillation in the circuit.

During positive pulses from switch 26, $V_s$ drops below $V_r$ and comparator 60 sends a signal to counter 140 which activates transistor 142 and closes the circuit for relay coil 150 which is powered by power supply 52. Relay coil 50 throws switch 360 to complete the circuit for light 80 between hot line 12a and neutral line 12b of cable 12. A second positive pulse of breaker switch 28b will be similarly processed in comparator 60 which sends a second signal to counter 140 which then deactives transistor 142 and opens the circuit which powers relay 150, thereby opening switch 360 and turning off light 80.

Power supply 52 is not materially responsive to half wave signals and maintains a continuous stepped down and receified DC voltage output available at relay coil 150. Power supply 52 also provides the supply voltage to counter 140 and a base reference to the counter upon which the output of comparator 60 is added.

Voltage and signal processor 54 similarly senses half wave pulses, but is instead sensitive to the opening of switch 28a. When breaker switch 28a is open, inverting step down transformer 104 receives negative pulses at primary coil 104 which is stepped down to positive voltage on the ground side of secondary coil 104b and a negative voltage on the other side of the secondary coil. In this instance, diode 202 blocks the appearance of the negative voltage across resistor 208 to comparator 62 as the voltage signal $V_s$. Thus voltage signal $V_s$ drops below the reference voltage $V_r$ supplied from capacitor 216 during the pulse and comparator 62 sends a signal to counter 228.

Counter 228 is provided with multiple outputs, here designated pins 12, 11 and 9 in component $Z_3$ of the preferred embodiment. Transistors 236, 240 and 248 are activated by the output from counter 228 at pins 12, 11, and 9, respectively. Control of transistors 236, 240 and 248 selectively closes the circuitry activating relay coils 238, 246 and 254, thereby throwing relay switches 350, 352 and 354, respectively. A combination of closed relay switches determines the capacity to motor 90 and thereby controls the motor speed.

Power supply 56 provides a step down DC voltage to each of relay coils 238, 246 and 254; to the voltage supply of counter 228; and as a constant output to counter 228 upon which the output of comparator 62 is added.

Transistors 236 and 248 of relays 72 and 76 are isolated by inverters 232 and 234 and inverter 250 and 252, respectively, from AND gate 230 which resets counter 228 when it receives an output from pins 12 and 9 of component $Z_3$ of the preferred embodiment.

Thus, the output of pins 12, 11 and 9 determines which of relay 72, 74 and 76 are closed. The logic controlling the output of counter 228 as a function of the counts of negative pulses from switch 26 is summarized in the table below for component $Z_3$ of the preferred embodiment.

| Number of Pulses | Relay 72 (Pin 12) | Relay 74 (Pin 11) | Relay 76 (Pin 9) |
|---|---|---|---|
| Reset | 0 | 0 | 0 |
| 1 | 1 | 0 | 0 |
| 2 | 0 | 1 | 0 |
| 3 | 1 | 1 | 0 |
| 4 | 0 | 0 | 1 |
| 5 | 1 | 0 | 1*Reset |

Although the invention has been illustrated with respect to remote control for a ceiling fan and light combination, the control circuit of the present invention is applicable to other multi-function applicances. This application is not intended to be limited merely to fan control usage and many additional applications will become apparent to those skilled in the art upon inspection of the circuitry as described above. Further, although the invention has been described and illustrated with a certain degree of particularity, it is understood that the present disclosure has been made by way of example only and the numerous changes in the details of construction and combination and arrangement of parts may be resorted to without departing from the spirit and scope of the invention as hereinafter claimed.

I claim:

1. A control circuit for switching an electrical appliance having a first and a second function powered between a hot line connected to a power source and a neutral line, said control circuit comprising:
   input means connected to said hot line for selectively establishing a first input signal and second input signal on said hot line;
   means connected to said hot line for generating a first control signal as a function of said first input signal, the function being substantially independent of the second input signal and the power for the electrical appliance which are also conducted on the hot line;
   first switch means responsive to said first control signal to control the first function of the electrical appliance;
   means connected to said hot line for generating a second control signal as a function of said second input signal, said function being substantially independent of the first input signal and the power for the electrical appliance which are also conducted on the hot line; and
   second switch means responsive to said second control signal to control the second function of the electrical appliance.

2. A control circuit in accordance with claim 1 in which said power source is AC current and wherein said input means comprises:
   means for selectively half-wave rectifying the AC power in the hot line to generate a first input signal of positive cycles; and
   means for selectively half-wave rectifying the AC power in the hot line to generate a second input signal of negative cycles.

3. A control circuit in accordance with claim 2 wherein a two button switch having a normally closed position provides both said means for selectively half-wave rectifying the AC current in the hot line.

4. A control circuit in accordance with claim 1 wherein said first switch means is a first relay.

5. A control circuit in accordance with claim 1 wherein said second switch means is a second relay.

6. A control circuit in accordance with claim 1 wherein said first switch means is a battery of relays.

7. A control circuit in accordance with claim 1 wherein said second switch means is a battery of relays.

8. A control circuit in accordance with claim 1 wherein said means for generating a first control signal comprises a logic circuit.

9. A control circuit in accordance with claim 8 wherein said logic circuit comprises a comparator in series with a counter circuit.

10. A control circuit in accordance with claim 1 wherein:
    said means for generating a first control signal further comprises:
    a first logic circuit sensing the first input signal; and
    a first counter connected to said first logic circuit receiving the output of the first logic circuit as the input thereof;
    said means for generating a second control signal further comprises:
    a second logic circuit sensing the second input signal;
    a second counter connected to said second logic circuit receiving the output of the second logic circuit as the input thereof;
    said first switch means includes at least one relay activated by the output of the first counter which controls the operation state of the first function of the dual function appliance; and
    said second switch means includes at least one relay actuated by the output of the second counter which controls the operational state of the second function of the dual function appliance.

11. A control circuit for switching a ceiling fan of the type having an associated light and an electric motor, each powered between a hot line connected to an AC power source and a neutral line, said control circuit comprising:
    input means connected to said hot line for selectively establishing a light input signal and a fan motor input signal on said hot line;
    means connected to said hot line for generating a light control signal as a function of said light input signal, the function being substantially independent of the fan motor input signal and the power for the ceiling fan which are also conducted on the hot line;
    first switch means responsive to said light control signal to control the light of the ceiling fan;
    means connected to said hot line for generating a fan motor control signal as a function of said fan motor input signal, said function being substantially independent of the light input signal and the power for the ceiling fan which are also conducted on the hot line; and
    second switch means responsive to said fan motor control signal to control the fan motor of the ceiling fan.

12. A control circuit in accordance with claim 11 wherein:
    said means for generating a light control signal further comprises:
    a light logic circuit sensing the light input signal; and
    a light signal counter connected to said light logic circuit receiving the output of the light logic circuit as the input thereof;
    said means for generating a fan motor control signal further comprises:
    a fan motor logic circuit sensing the fan motor input signal;
    a fan motor signal counter connected to said fan motor logic circuit receiving the output of the fan motor logic circuit as the input thereof:
    said first switch means includes at least one relay activated by the output of the light signal counter which controls light in the ceiling fan; and
    said fan motor switch means includes at least one relay actuated by the output of the fan motor signal counter which controls the operational state of the fan motor of the ceiling fan.

* * * * *